United States Patent
Kyoto et al.

(10) Patent No.: US 12,151,305 B2
(45) Date of Patent: Nov. 26, 2024

(54) LASER BEAM MACHINE AND METHOD FOR CONTROLLING LASER BEAM MACHINE

(71) Applicant: Mitsubishi Electric Corporation, Tokyo (JP)

(72) Inventors: Tomohiro Kyoto, Tokyo (JP); Masato Kawasaki, Tokyo (JP); Hiroshi Kikuchi, Tokyo (JP); Kyohei Ishikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/691,044

(22) PCT Filed: May 27, 2022

(86) PCT No.: PCT/JP2022/021699
§ 371 (c)(1),
(2) Date: Mar. 12, 2024

(87) PCT Pub. No.: WO2023/228397
PCT Pub. Date: Nov. 30, 2023

(65) Prior Publication Data
US 2024/0261892 A1    Aug. 8, 2024

(51) Int. Cl.
*B23K 26/06* (2014.01)
(52) U.S. Cl.
CPC .................................. *B23K 26/06* (2013.01)
(58) Field of Classification Search
None
See application file for complete search history.

(56) References Cited

U.S. PATENT DOCUMENTS

| | | | |
|---|---|---|---|
| 5,684,642 A | 11/1997 | Zumoto et al. | |
| 10,583,525 B2 | 3/2020 | Ito et al. | |

(Continued)

FOREIGN PATENT DOCUMENTS

| | | | | |
|---|---|---|---|---|
| EP | 0723834 A1 | * | 7/1996 | ........... B23K 26/064 |
| JP | H05304074 A | * | 11/1993 | ......... G03F 7/70058 |

(Continued)

OTHER PUBLICATIONS

International Search Report and Written Opinion mailed on Aug. 2, 2022, received for PCT Application PCT/JP2022/021699, filed on May 27, 2022, 09 pages including English Translation.

(Continued)

*Primary Examiner* — Janie M Loeppke
*Assistant Examiner* — Theodore J Evangelista
(74) *Attorney, Agent, or Firm* — XSENSUS LLP

(57) ABSTRACT

A laser beam machine includes: a laser oscillator that outputs laser light; a transmission fiber through which the laser light output from the laser oscillator propagates; a first adjuster that is disposed between the laser oscillator and an incidence end of the transmission fiber and changes an incidence numerical aperture of the laser light incident to the incidence end of the transmission fiber; a second adjuster that converges the laser light and changes a zoom magnification of the laser light between an emission end of the transmission fiber and a workpiece; and a controller that performs adjustment of a beam diameter of the laser light at an image forming position of the laser light and adjustment of an emission numerical aperture of the laser light emitted from the emission end of the transmission fiber independently of each other, by changing the incidence numerical aperture.

17 Claims, 5 Drawing Sheets

(56) References Cited

U.S. PATENT DOCUMENTS

| | | |
|---|---|---|
| 2013/0148925 A1 | 6/2013 | Muendel et al. |
| 2016/0116679 A1 | 4/2016 | Muendel et al. |
| 2019/0084082 A1 | 3/2019 | Ito et al. |

FOREIGN PATENT DOCUMENTS

| | | | |
|---|---|---|---|
| JP | H07-227686 A | | 8/1995 |
| JP | H08-025070 A | | 1/1996 |
| JP | H0825070 A | * | 1/1996 |
| JP | H08-267264 A | | 10/1996 |
| JP | 2015-500571 A | | 1/2015 |
| JP | 2017-185502 A | | 10/2017 |
| JP | 2019-042793 A | | 3/2019 |
| JP | 2020-060725 A | | 4/2020 |
| WO | 2017203613 A1 | | 11/2017 |

OTHER PUBLICATIONS

Office Action mailed on Aug. 7, 2024 for German patent application No. DE 11 2022 004 780.1 (12 pages; with English machine translation).

* cited by examiner

LASER BEAM MACHINE AND METHOD FOR CONTROLLING LASER BEAM MACHINE

CROSS-REFERENCE TO RELATED APPLICATION

This application is based on PCT filing PCT/JP2022/021699, filed May 27, 2022, the entire contents of which are incorporated herein by reference.

FIELD

The present disclosure relates to a laser beam machine for machining a workpiece by irradiation with laser light, and a method for controlling the laser beam machine.

BACKGROUND

In laser machining using laser light, it is expected that high-quality machining can be performed or machining can be performed with high efficiency, on workpieces of various materials or various thicknesses. For this purpose, it is required to adjust an irradiation condition of the laser light such as a beam diameter of the laser light at a condensing position or a convergence angle of the laser light at the condensing position to a state suitable for machining the workpiece.

Patent Literature 1 discloses a laser system that continuously changes a beam diameter by changing a convergence angle of laser light incident to a transmission fiber.

CITATION LIST

Patent Literature

Patent Literature 1: Japanese Translation of PCT International Application Laid-open No. 2015-500571

SUMMARY OF INVENTION

Problem to be Solved by the Invention

According to the related art disclosed in Patent Literature 1, a beam diameter at a condensing position can be adjusted, but a convergence angle of laser light at the condensing position is not adjusted. Therefore, according to the related art, there has been a problem that it is difficult to perform adjustment for irradiation with laser light suitable for machining a workpiece.

The present disclosure has been made in view of the above, and an object of the present disclosure is to provide a laser beam machine that enables adjustment for irradiation with laser light suitable for machining a workpiece.

Means to Solve the Problem

To solve the above problems and achieve the object, a laser beam machine according to the present disclosure includes: a laser oscillator configured to output laser light; a transmission fiber through which the laser light output from the laser oscillator propagates; a first adjuster configured to change an incidence numerical aperture of the laser light incident to an incidence end of the transmission fiber, the first adjuster being disposed between the laser oscillator and the incidence end of the transmission fiber; a second adjuster configured to converge the laser light and change a zoom magnification of the laser light between an emission end of the transmission fiber and a workpiece; and a controller configured to perform adjustment of a beam diameter of the laser light at an image forming position of the laser light and adjustment of an emission numerical aperture of the laser light emitted from the emission end of the transmission fiber independently of each other, by changing the incident numerical aperture by controlling the first adjuster and changing the zoom magnification by controlling the second adjuster.

Effects of the Invention

The laser beam machine according to the present disclosure has an effect of enabling adjustment for irradiation with laser light suitable for machining a workpiece.

DESCRIPTION OF EMBODIMENTS

Hereinafter, a laser beam machine according to an embodiment and a method for controlling the laser beam machine will be described in detail with reference to the drawings.

First Embodiment

Figure 1:
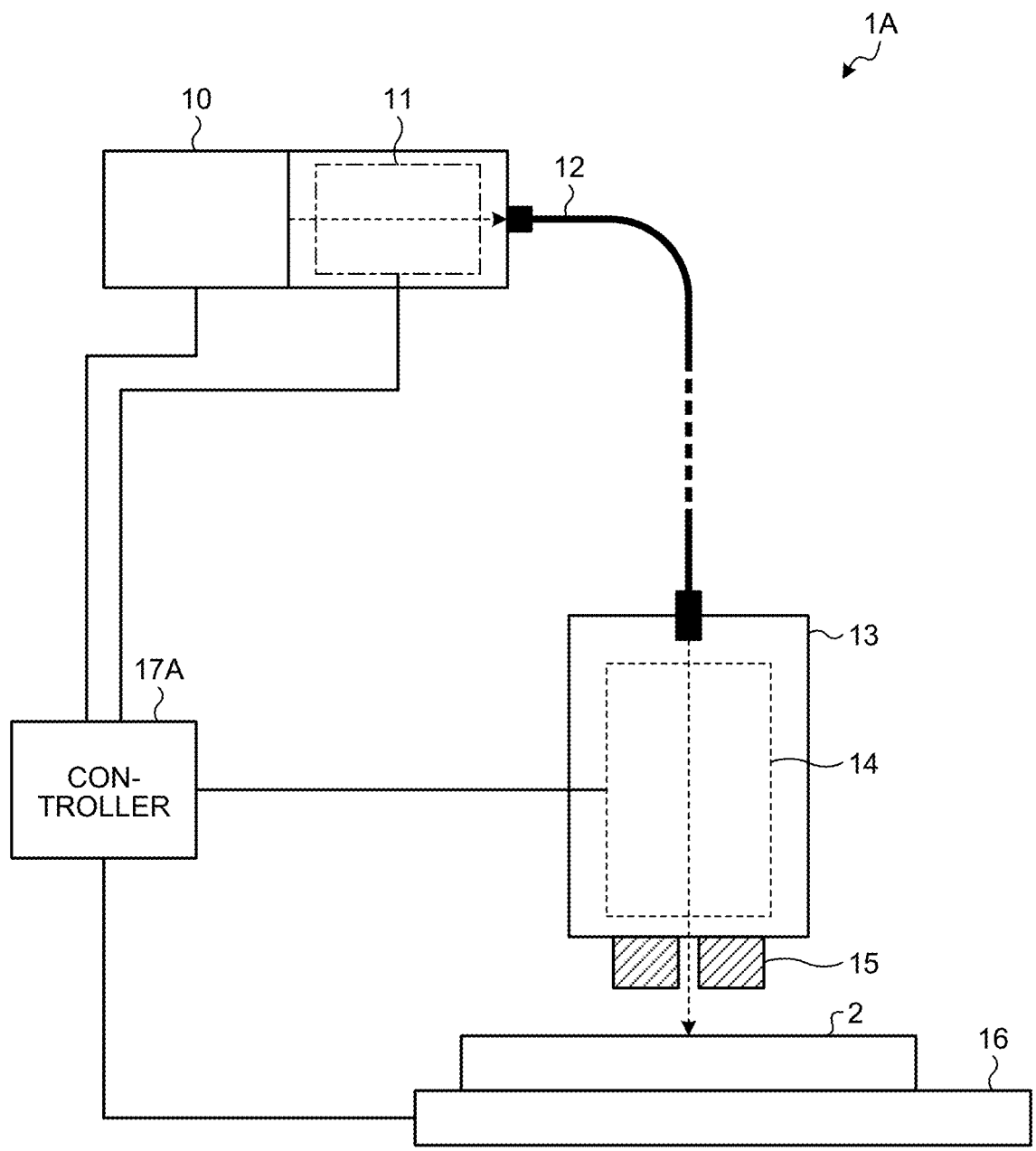
FIG. 1 is a view illustrating a configuration example of a laser beam machine according to a first embodiment.

FIG. 1 is a view illustrating a configuration example of a laser beam machine 1A according to a first embodiment. The laser beam machine 1A is configured to machine a workpiece 2 by irradiation with laser light.

The laser beam machine 1A includes: a laser oscillator 10 that is a light source; a first adjuster 11 that is an incidence numerical aperture (NA) switching device; a transmission fiber 12 through which laser light propagates; a machining head 13; a second adjuster 14 that is a zoom magnification adjuster; a nozzle 15; a stage 16 configured to support the workpiece 2; and a controller 17A configured to control the entire laser beam machine 1A.

The laser oscillator 10 is configured to output laser light that is a laser beam. The laser light output from the laser oscillator 10 passes through the first adjuster 11 and is incident to the transmission fiber 12. The first adjuster 11 is disposed between the laser oscillator 10 and an incidence end of the transmission fiber 12, and changes an incidence NA of the laser light incident to the incidence end of the transmission fiber 12. Note that, in the following description, the incidence NA of the laser light incident to the incidence end of the transmission fiber 12 is referred to as an incidence NA of the transmission fiber 12. FIG. 1 schematically illustrates the first adjuster 11. In FIG. 1, a broken line arrow illustrated between the laser oscillator 10 and the incidence end of the transmission fiber 12 represents a state in which the laser light passes through the first adjuster 11.

An emission end of the transmission fiber 12 is connected to the machining head 13. The laser light having propagated through the transmission fiber 12 is incident to the machining head 13. The second adjuster 14 is provided inside the machining head 13. The second adjuster 14 converges the laser light. In addition, the second adjuster 14 changes a zoom magnification of the laser light from the emission end of the transmission fiber 12 to the workpiece 2. FIG. 1 schematically illustrates the second adjuster 14. The nozzle 15 is attached to the machining head 13. The nozzle 15 causes the laser light to be emitted toward the workpiece 2, and sends out machining gas.

The laser light passes through the second adjuster 14 inside the machining head 13, and is emitted from the nozzle 15 to the outside of the machining head 13. The laser light emitted from the machining head 13 is incident to the workpiece 2. In FIG. 1, a broken line arrow between the emission end of the transmission fiber 12 and the workpiece 2 indicates a state in which the laser light emitted from the emission end of the transmission fiber 12 passes through the second adjuster 14 and reaches the workpiece 2 via the nozzle 15. Further, the laser beam machine 1A also injects the machining gas from the nozzle 15 to the workpiece 2. An element for injecting the machining gas is not illustrated.

The laser beam machine 1A relatively moves the laser light and the workpiece 2 by moving the stage 16 with respect to the machining head 13. Note that the laser beam machine 1A may relatively move the laser light and the workpiece 2 without moving the stage 16. The laser beam machine 1A may fix a position of the stage 16 and control an incident position of the laser light on the workpiece 2.

The controller 17A transmits a control signal to each of the laser oscillator 10, the first adjuster 11, the second adjuster 14, and the stage 16. The laser oscillator 10 outputs the laser light in response to the control signal. The first adjuster 11 operates in response to the control signal. The second adjuster 14 operates in response to the control signal. The stage 16 operates in response to the control signal. In this manner, the controller 17A controls each of the laser oscillator 10, the first adjuster 11, the second adjuster 14, and the stage 16.

The controller 17A adjusts a beam diameter of the laser light at an image forming position of the laser light, by changing a zoom magnification by controlling the second adjuster 14. The controller 17A adjusts an emission NA of the laser light emitted from the emission end of the transmission fiber 12, by changing the incidence NA of the transmission fiber 12 by controlling the first adjuster 11. Note that, in the following description, the emission NA of the laser light emitted from the emission end of the transmission fiber 12 is referred to as an emission NA of the transmission fiber 12. The controller 17A changes the incidence NA of the transmission fiber 12 by controlling the first adjuster 11 and changes the zoom magnification by controlling the second adjuster 14, to perform adjustment of a beam diameter of the laser light at the image forming position of the laser light and adjustment of the emission NA of the transmission fiber 12, independently of each other.

Next, details of the first adjuster 11 and the second adjuster 14 will be described. The first adjuster 11 includes an optical element that diverges the laser light. The first adjuster 11 changes a divergence angle by operating the optical element. A divergence angle of the laser light emitted from the emission end of the transmission fiber 12 is changed by changing a divergence angle of the laser light incident to the incidence end of the transmission fiber 12, by using the first adjuster 11.

Figure 2:
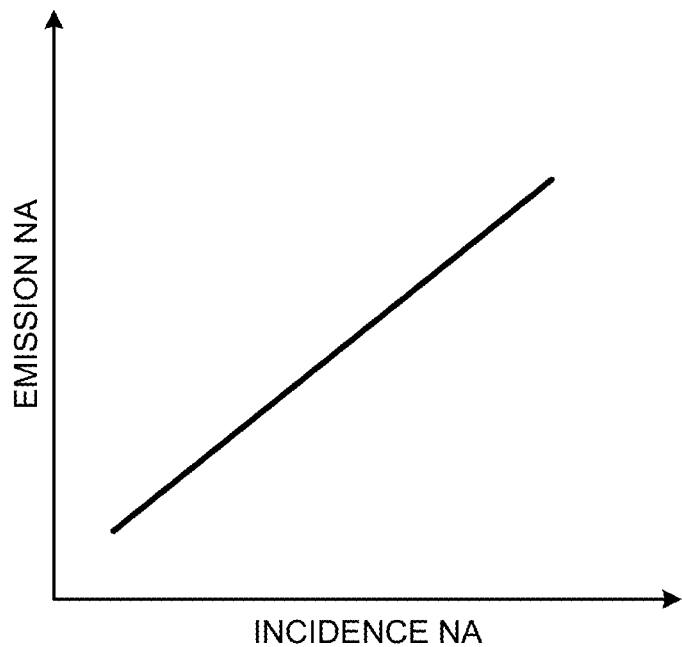
FIG. 2 is a view for explaining a change in divergence angle by a first adjuster included in the laser beam machine according to the first embodiment.

FIG. 2 is a view for explaining a change in divergence angle by the first adjuster 11 included in the laser beam machine 1A according to the first embodiment. FIG. 2 is a graph illustrating a relationship between the incidence NA representing the divergence angle of the laser light incident to the incidence end of the transmission fiber 12 and the emission NA representing the divergence angle of the laser light emitted from the emission end of the transmission fiber 12. According to the graph illustrated in FIG. 2, the emission NA increases as the incidence NA increases. That is, by changing the divergence angle of the laser light incident to the incidence end of the transmission fiber 12, the divergence angle of the laser light emitted from the emission end of the transmission fiber 12 changes. In the example illustrated in FIG. 2, the emission NA is proportional to the incidence NA.

For example, the first adjuster 11 includes a plurality of lenses having mutually different focal lengths. Each lens is movable to a position on an optical axis and a position deviated from the optical axis. The first adjuster 11 switches the lens through which the laser light passes, by inserting each lens onto the optical axis and extracting each lens from the optical axis. The first adjuster 11 changes the divergence angle by switching the lens through which the laser light passes. Note that the first adjuster 11 may change the divergence angle by appropriately moving each lens in a direction of the optical axis. The first adjuster 11 may change the divergence angle by shifting a center position of the lens from the optical axis in a state where the lens is left in an optical path of the laser light, instead of completely extracting the lens from the optical path. A configuration of the first adjuster 11 is not limited to the configuration described above, and may be optional.

The second adjuster 14 includes an optical element that forms an image of the emission end of the transmission fiber 12. The second adjuster 14 changes the zoom magnification by operating the optical element. The second adjuster 14 changes a beam diameter at the image forming position by changing the zoom magnification. For example, the second adjuster 14 includes a plurality of lenses disposed on an optical axis. The second adjuster 14 changes the zoom magnification by appropriately moving each lens in a direction of the optical axis. A configuration of the second adjuster 14 is not limited to the configuration described above, and may be optional.

When reference character "d1" is a beam diameter at the emission end of the transmission fiber 12, reference character "d2" is a beam diameter at the image forming position, and reference character "M" is a zoom magnification of the second adjuster 14, d2=M×d1 is satisfied. Further, when reference character "r1" is a spread angle of the laser light at the emission end of the transmission fiber 12, and reference character "r2" is a convergence angle of the laser light at the image forming position, r2=(1/M)×r1 is satisfied. Note that, since "d1" is roughly determined by a core diameter of the transmission fiber 12, "d2" can be controlled by "M".

"r2" corresponds to a beam diameter change amount. The beam diameter change amount is a change amount of the beam diameter with respect to a distance from the image forming position.

"r1" is proportional to the emission NA of the transmission fiber 12. "r1" changes substantially in proportion to the incidence NA of the transmission fiber 12. Therefore, "r2", that is, the beam diameter change amount can be controlled by the incidence NA of the transmission fiber 12. As described above, control of the beam diameter at the image forming position and control of the beam diameter change amount can be performed using different adjusters. The controller 17A can perform adjustment of the beam diameter at the image forming position and adjustment of the beam diameter change amount independently of each other, by performing adjustment of the beam diameter at the image forming position and adjustment of the emission NA of the transmission fiber 12 independently of each other by using the first adjuster 11 and the second adjuster 14. The laser beam machine 1A can use two parameters, that is, the beam diameter at the image forming position and the beam diameter change amount, that is, the convergence angle, as control parameters for changing an irradiation condition of the laser light.

Figure 3:
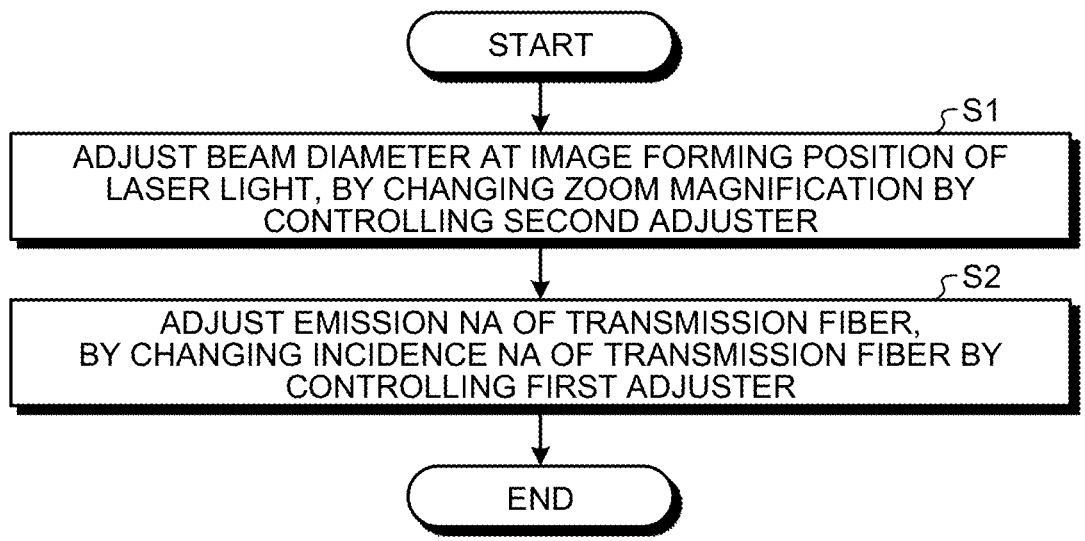
FIG. 3 is a flowchart illustrating a procedure of an operation by the laser beam machine according to the first embodiment.

Next, an operation for adjusting the beam diameter and adjusting the emission NA of the transmission fiber 12 by the laser beam machine 1A will be described. FIG. 3 is a flowchart illustrating a procedure of an operation by the laser beam machine 1A according to the first embodiment. FIG. 3 illustrates a procedure of an operation for adjusting the beam diameter and adjusting the emission NA of the transmission fiber 12. The operation according to the procedure illustrated in FIG. 3 is realized by control by the controller 17A.

In step S1, the laser beam machine 1A adjusts the beam diameter at the image forming position of the laser light, by changing the zoom magnification by controlling the second adjuster 14. In step S1, the beam diameter at the image forming position is determined.

Next, in step S2, the laser beam machine 1A adjusts the emission NA of the transmission fiber 12, by changing the incidence NA of the transmission fiber 12 by controlling the first adjuster 11. The beam diameter change amount is adjusted by adjusting the emission NA of the transmission fiber 12 in step S2. Thus, the laser beam machine 1A terminates the operation according to the procedure illustrated in FIG. 3.

According to the first embodiment, the laser beam machine 1A includes the first adjuster 11 and the second adjuster 14, and performs adjustment of the beam diameter at the image forming position and adjustment of the emission NA of the transmission fiber 12 independently of each other, by changing the incidence NA of the transmission fiber 12 by controlling the first adjuster 11 and changing the zoom magnification by controlling the second adjuster 14. The laser beam machine 1A can adjust a beam diameter according to a thickness of the workpiece 2 or a material of the workpiece 2. In addition, the laser beam machine 1A can adjust a convergence angle according to the thickness of the workpiece 2 or the material of the workpiece 2. As described above, the laser beam machine 1A achieves an effect of enabling adjustment for irradiation with the laser light suitable for machining the workpiece 2.

The laser beam machine 1A can optimize a supply amount of beam energy in a thickness direction of the workpiece 2, by being able to control the beam diameter change amount as a control parameter different from the beam diameter. As a result, the laser beam machine 1A can perform high-quality machining. In addition, the laser beam machine 1A can improve a machining speed and can perform machining with high efficiency. The laser beam machine 1A can improve the machining quality and the machining speed particularly for a middle thick plate or a plate thicker than the middle thick plate.

Second Embodiment

Figure 4:
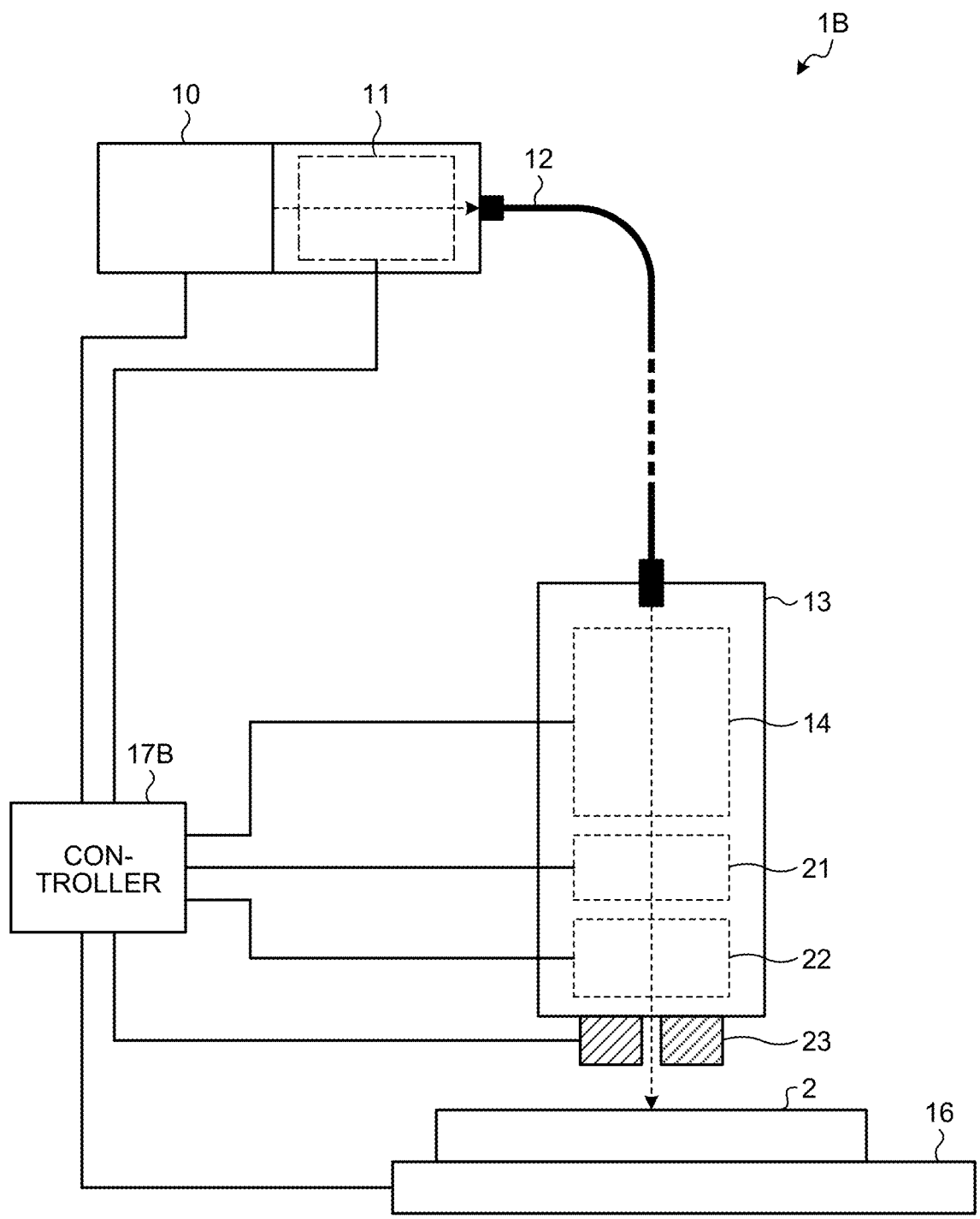
FIG. 4 is a view illustrating a configuration example of a laser beam machine according to a second embodiment.

In a second embodiment, an example will be described in which a control parameter for changing an irradiation condition of the laser light is added to the configuration of the first embodiment. FIG. 4 is a view illustrating a configuration example of a laser beam machine 1B according to the second embodiment.

The laser beam machine 1B is different from the laser beam machine 1A illustrated in FIG. 1 in that the laser beam machine 1B includes a third adjuster 21 that is a beam profile switching device, a fourth adjuster 22 that is an image forming position adjuster, and a fifth adjuster 23 that is a nozzle position adjuster. The fifth adjuster 23 is provided instead of the nozzle 15 illustrated in FIG. 1. In addition, the laser beam machine 1B is provided with a controller 17B different from the controller 17A illustrated in FIG. 1. The controller 17B controls the entire laser beam machine 1B. In the second embodiment, components identical to those in the first embodiment described above are denoted by identical reference numerals, and configurations different from those in the first embodiment will be mainly described.

The second adjuster 14, the third adjuster 21, and the fourth adjuster 22 are provided inside the machining head 13. The second adjuster 14, the third adjuster 21, and the fourth adjuster 22 are disposed between the emission end of the transmission fiber 12 and the workpiece 2. The third adjuster 21 changes a beam profile of the laser light between the emission end of the transmission fiber 12 and the workpiece 2. The fourth adjuster 22 changes a distance from the image forming position to a surface of the workpiece 2. FIG. 4 schematically illustrates each of the third adjuster 21 and the fourth adjuster 22. The laser light sequentially passes through the second adjuster 14, the third adjuster 21, and the fourth adjuster 22 inside the machining head 13, and is emitted from the fifth adjuster 23 to the outside of the machining head 13.

The fifth adjuster 23 corresponds to an adjuster capable of moving the nozzle 15 illustrated in FIG. 1 in a direction of an optical axis. The fifth adjuster 23 changes a distance from the nozzle 15 to a surface of the workpiece 2. In the example illustrated in FIG. 4, the fifth adjuster 23 includes the nozzle 15 and an adjuster that operates the nozzle 15. In FIG. 4, the fifth adjuster 23 is illustrated as a form similar to the nozzle 15 illustrated in FIG. 1. Here, it is assumed that the nozzle 15 is moved in a direction of the optical axis separately from the machining head 13. The fifth adjuster 23 is not limited to one that moves the nozzle 15 separately from the machining head 13. The fifth adjuster 23 may move the nozzle 15 integrated with the machining head 13 in the direction of the optical axis by moving the machining head 13 in the direction of the optical axis.

The controller 17B transmits a control signal to each of the laser oscillator 10, the first adjuster 11, the second adjuster 14, the third adjuster 21, the fourth adjuster 22, the fifth adjuster 23, and the stage 16. Each of the third adjuster 21, the fourth adjuster 22, and the fifth adjuster 23 operates in response to the control signal. The controller 17B controls each of the laser oscillator 10, the first adjuster 11, the second adjuster 14, the third adjuster 21, the fourth adjuster 22, the fifth adjuster 23, and the stage 16.

The controller 17B switches a beam profile independently for each of adjustment of a beam diameter at the image forming position and adjustment of the emission NA of the transmission fiber 12, by controlling the third adjuster 21. By controlling the fourth adjuster 22, the controller 17B adjusts the distance from the image forming position to the surface of the workpiece 2, independently for each of adjustment of the beam diameter at the image forming position and adjustment of the emission NA of the transmission fiber 12. By controlling the fifth adjuster 23, the controller 17B adjusts the distance from the nozzle 15 to the surface of the workpiece 2, independently for each of adjustment of the beam diameter at the image forming position and adjustment of the emission NA of the transmission fiber 12. Further, the controller 17B performs switching of the beam profile by controlling the third adjuster 21, adjustment of the distance from the image forming position to the surface of the workpiece 2 by controlling the fourth adjuster 22, and adjustment of the distance from the nozzle 15 to the surface of the workpiece 2 by controlling the fifth adjuster 23, independently of each other.

Next, details of the third adjuster 21, the fourth adjuster 22, and the fifth adjuster 23 will be described. The third adjuster 21 includes an optical element that converts a beam profile. The third adjuster 21 switches the beam profile by operating the optical element. The optical element of the third adjuster 21 is, for example, an axicon lens. The third adjuster 21 inserts the axicon lens onto the optical axis and extracts the axicon lens from the optical axis. The third adjuster 21 switches the beam profile between a mode when the axicon lens is inserted on the optical axis and a mode when the axicon lens is extracted outside the optical axis. A configuration of the third adjuster 21 is not limited to the above configuration, and may be optional.

Figure 5:
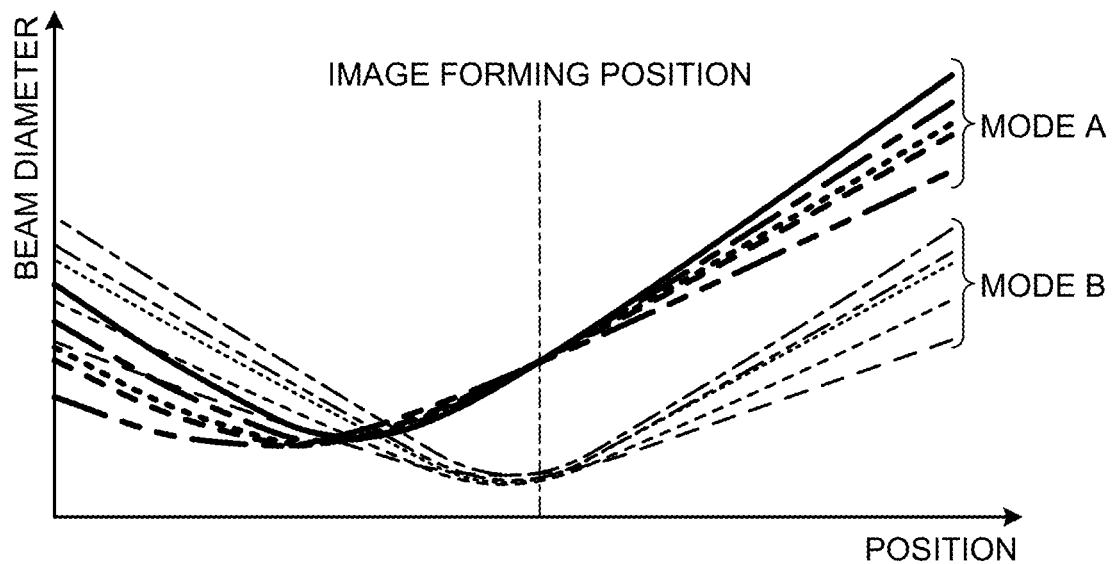
FIG. 5 is a first view for explaining switching of a beam profile by a third adjuster included in the laser beam machine according to the second embodiment.

FIG. 5 is a first view for explaining switching of a beam profile by the third adjuster 21 included in the laser beam machine 1B according to the second embodiment.

FIG. 5 is a graph illustrating a relationship between a beam diameter and a position in the direction of the optical axis. In FIG. 5, a vertical axis represents a beam diameter. A horizontal axis represents a position in the direction of the optical axis. A direction of an arrow as the horizontal axis is a direction toward the workpiece 2. A direction opposite to the direction of the arrow is a direction toward the laser oscillator 10. An inclination of the graph illustrated in FIG. 5 represents a beam diameter change amount. Mode A is a mode when the axicon lens is inserted on the optical axis. Mode B is a mode when the axicon lens is extracted outside the optical axis. In FIG. 5, a plurality of graphs of Mode A represent a relationship between the beam diameter and the position in the direction of the optical axis for each of the cases where the divergence angle is changed by the first adjuster 11 in Mode A. In FIG. 5, a plurality of graphs of Mode B represent a relationship between the beam diameter and the position in the direction of the optical axis for each of the cases where the divergence angle is changed by the first adjuster 11 in Mode B.

Figure 6:
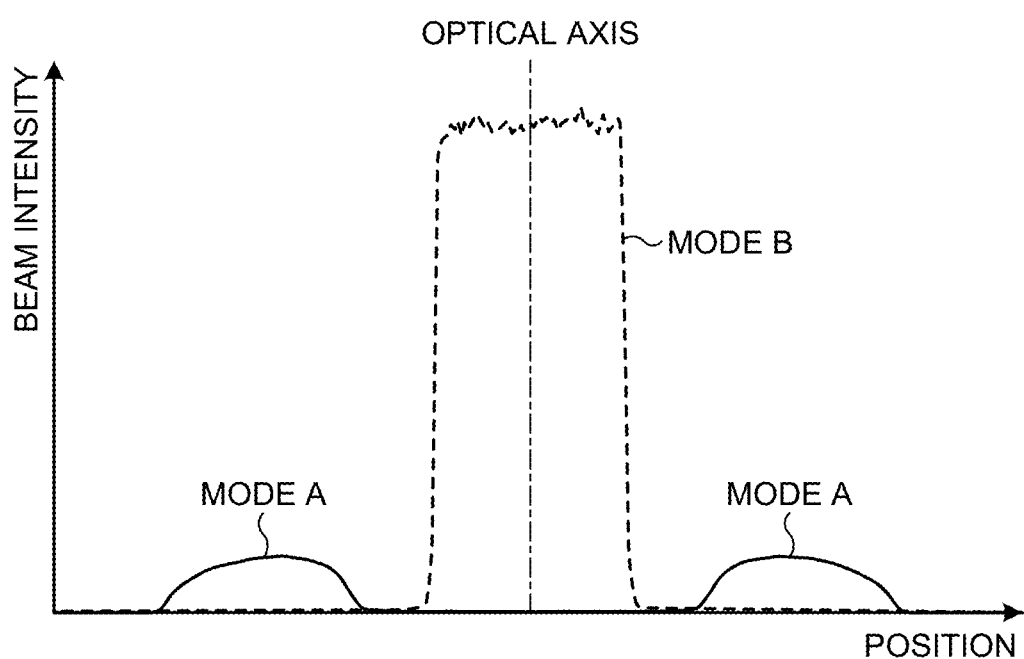
FIG. 6 is a second view for explaining switching of a beam profile by the third adjuster included in the laser beam machine according to the second embodiment.

FIG. 6 is a second view for explaining switching of a beam profile by the third adjuster 21 included in the laser beam machine 1B according to the second embodiment. FIG. 6 illustrates a beam profile at the image forming position for each of Mode A and Mode B. In FIG. 6, a vertical axis represents a beam intensity. A horizontal axis represents a position in a direction of a beam diameter. Mode A is a ring-shaped beam profile. Mode B is a top-hat-shaped beam profile.

As illustrated in FIG. 5, when the beam profile is Mode A, a beam diameter at a position away from the image forming position in the direction of the optical axis is changed by changing the divergence angle by using the first adjuster 11. That is, the beam diameter change amount changes due to a change in divergence angle. The beam diameter at the image forming position is constant even when the divergence angle changes. Further, when the beam profile is Mode B, a beam diameter at a position away from the image forming position in the direction of the optical axis changes. That is, the beam diameter change amount is changed by changing the divergence angle by using the first adjuster 11. The beam diameter at the image forming position is constant even when the divergence angle changes. Further, when the beam profile is switched between Mode A and Mode B, the beam diameter change amount changes. By switching the beam profile between Mode A and Mode B, the beam diameter at the image forming position changes.

The laser beam machine 1B can switch, by using the third adjuster 21, the beam profile of the laser light with which the workpiece 2 is irradiated. Note that the third adjuster 21 only needs to be able to switch the beam profile to a plurality of modes, and is not limited to switching the beam profile to Mode A and Mode B illustrated in FIG. 6.

The fourth adjuster 22 includes one or more lenses. The fourth adjuster 22 moves the image forming position in the direction of the optical axis, by operating the lens in the direction of the optical axis. The fourth adjuster 22 changes a distance from the image forming position to the surface of the workpiece 2 by moving the image forming position. A configuration of the fourth adjuster 22 is not limited to the above configuration, and may be optional.

The laser beam machine 1B can switch a beam diameter on the workpiece 2 by changing the distance from the image forming position to the surface of the workpiece 2 by using the fourth adjuster 22. In addition, the laser beam machine 1B can switch the beam diameter change amount by changing the distance from the image forming position to the surface of the workpiece 2 by using the fourth adjuster 22.

The fifth adjuster 23 includes an adjuster that moves the nozzle 15 in the direction of the optical axis or an adjuster that moves the machining head 13 in the direction of the optical axis. Any adjuster can be applied to the adjuster that moves the nozzle 15 or the adjuster that moves the machining head 13.

The laser beam machine 1B can switch a relative positional relationship between a flow of machining gas supplied from the nozzle 15 and the laser light, by changing a distance from the nozzle 15 to the surface of the workpiece 2 by using the fifth adjuster 23.

Similarly to the controller 17A of the first embodiment, the controller 17B performs adjustment of the beam diameter at the image forming position and adjustment of the emission NA of the transmission fiber 12 independently of each other, by using the first adjuster 11 and the second adjuster 14. Further, the controller 17B switches the beam profile by using the third adjuster 21. The controller 17B adjusts a distance from the image forming position to the surface of the workpiece 2 by using the fourth adjuster 22. The laser beam machine 1B can use four parameters of: the beam diameter at the image forming position; the beam diameter change amount, that is, the convergence angle; the beam profile; and the distance from the image forming position to the surface of the workpiece 2, as control parameters for changing an irradiation condition of the laser light.

In addition, the controller 17B adjusts the distance from the nozzle 15 to the surface of the workpiece 2 by using the fifth adjuster 23. The laser beam machine 1B can use the distance from the nozzle 15 to the surface of the workpiece 2 as a control parameter for the relative positional relationship between the flow of the machining gas and the laser light. The laser beam machine 1B can switch the relative positional relationship between the flow of the machining gas and the laser light.

According to the second embodiment, similarly to the case of the first embodiment, the laser beam machine 1B can adjust a beam diameter according to a thickness of the workpiece 2 or a material of the workpiece 2, and adjust the convergence angle according to the thickness of the workpiece 2 or the material of the workpiece 2. Further, the laser beam machine 1B can switch the beam profile according to the thickness of the workpiece 2 or the material of the workpiece 2. The laser beam machine 1B can adjust a distance from the image forming position to the surface of the workpiece 2 according to the thickness of the workpiece 2 or the material of the workpiece 2. As described above, the laser beam machine 1B achieves an effect of enabling adjustment for irradiation with the laser light suitable for machining the workpiece 2.

In addition, the laser beam machine 1B can switch the relative positional relationship between the flow of the machining gas and the laser light in accordance with the thickness of the workpiece 2 or the material of the workpiece 2. The laser beam machine 1B can optimize a chemical interaction between a flow of the machining gas and irradiation with the laser light, by switching the relative positional relationship between the flow of the machining gas and the laser light. As a result, the laser beam machine 1B can improve the machining quality and the machining speed.

Note that, in the second embodiment, the example has been described in which the third adjuster 21, the fourth adjuster 22, and the fifth adjuster 23 are provided in addition to the first adjuster 11 and the second adjuster 14, but the present disclosure is not limited thereto. The laser beam machine 1B is only required to include at least one of the third adjuster 21, the fourth adjuster 22, and the fifth adjuster 23. The laser beam machine 1B can improve the machining quality and the machining speed by including at least one of the third adjuster 21, the fourth adjuster 22, and the fifth adjuster 23.

Next, a hardware configuration for implementing the controller 17A according to the first embodiment or the controller 17B according to the second embodiment will be described. The controllers 17A and 17B are implemented by processing circuitry. The processing circuitry may be circuitry in which a processor executes software, or may be dedicated circuitry.

Figure 7:
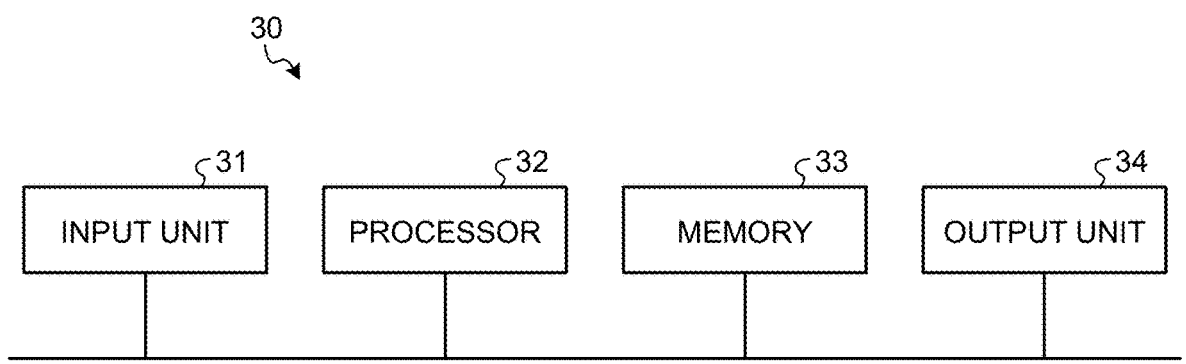
FIG. 7 is a diagram illustrating a configuration example of a control circuit according to the first or second embodiment.

In a case where the processing circuitry is implemented by software, the processing circuitry is, for example, a control circuit 30 illustrated in FIG. 7. FIG. 7 is a diagram illustrating a configuration example of the control circuit 30 according to the first or second embodiment. The control circuit 30 includes an input unit 31, a processor 32, a memory 33, and an output unit 34.

The input unit 31 is an interface circuit that receives data input from the outside of the control circuit 30 and gives data to the processor 32. The output unit 34 is an interface circuit that sends data from the processor 32 or the memory 33 to the outside of the control circuit 30. In a case where the processing circuitry is the control circuit 30 illustrated in FIG. 7, the functions of the controllers 17A and 17B are implemented by the processor 32 reading and executing a program stored in the memory 33. The memory 33 is also used as a temporary memory in each process performed by the processor 32.

The processor 32 is a central processing unit (CPU, may also be referred to as a central processing device, a processing unit, an arithmetic unit, a microprocessor, a microcomputer, a processor, or a digital signal processor (DSP)). The memory 33 corresponds to, for example, a nonvolatile or volatile semiconductor memory such as a random access memory (RAM), a read only memory (ROM), a flash memory, an erasable programmable read only memory (EPROM), or an electrically erasable programmable read-only memory (EEPROM) (registered trademark), a magnetic disk, a flexible disk, an optical disk, a compact disk, a mini disk, a digital versatile disc (DVD), or the like.

Figure 8:
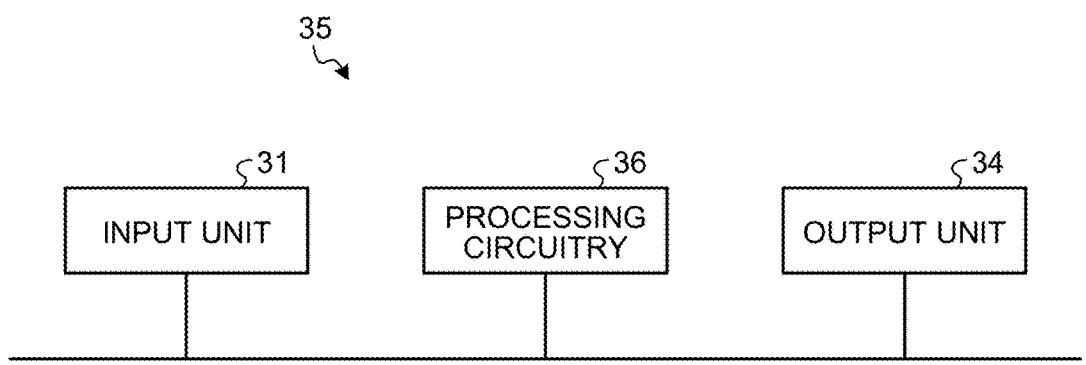
FIG. 8 is a diagram illustrating a configuration example of a dedicated hardware circuit according to the first or second embodiment.

FIG. 7 is an example of hardware in a case where the controllers 17A and 17B are implemented by the general-purpose processor 32 and the memory 33, but the controllers 17A and 17B may be implemented by dedicated hardware circuits. FIG. 8 is a diagram illustrating a configuration example of a dedicated hardware circuit 35 according to the first or second embodiment.

The dedicated hardware circuit 35 includes the input unit 31, the output unit 34, and processing circuitry 36. The processing circuitry 36 is a single circuit, a composite circuit, a programmed processor, a parallel programmed processor, an application specific integrated circuit (ASIC), a field programmable gate array (FPGA), or a circuit obtained by combining these. Note that the controllers 17A and 17B may be implemented by combining the control circuit 30 and the hardware circuit 35.

The configuration described in each of the above embodiments illustrates an example of the contents of the present disclosure. The configuration of each embodiment can be combined with another known technique. The configurations of the individual embodiments may be appropriately combined. A part of the configuration of each embodiment can be omitted or changed without departing from the gist of the present disclosure.

REFERENCE SIGNS LIST 1A, 1B laser beam machine; 2 workpiece; 10 laser oscillator; 11 first adjuster; 12 transmission fiber; 13 machining head; 14 second adjuster; 15 nozzle; 16 stage; 17A, 17B controller; 21 third adjuster; 22 fourth adjuster; 23 fifth adjuster; 30 control circuit; 31 input unit; 32 processor; 33 memory; 34 output unit; 35 hardware circuit; 36 processing circuitry.

The invention claimed is:

1. A laser beam machine comprising:
a laser oscillator configured to output laser light;
a transmission fiber through which the laser light output from the laser oscillator propagates;
a first adjuster configured to adjust an emission numerical aperture of the laser light emitted from an emission end of the transmission fiber by changing an incidence numerical aperture of the laser light incident to an incidence end of the transmission fiber, the first adjuster being disposed between the laser oscillator and the incidence end of the transmission fiber, the first adjuster including a plurality of lenses that are each movable into a position on an optical axis and into a position deviated from the optical axis;

a second adjuster configured to converge the laser light and change a zoom magnification of the laser light between an emission end of the transmission fiber and a workpiece; and a controller configured to:
adjust a beam diameter of the laser light at an image forming position of the laser light by controlling the second adjuster; and
adjust a beam diameter change amount that is a change amount of the beam diameter with respect to a distance from the image forming position independently of adjustment of the beam diameter, by adjusting the emission numerical aperture by controlling the first adjuster.

2. The laser beam machine according to claim 1, further comprising:
a third adjuster configured to change a beam profile of the laser light between the emission end of the transmission fiber and the workpiece, wherein
the controller is configured to switch the beam profile independently for each of adjustment of the beam diameter and adjustment of the emission numerical aperture, by controlling the third adjuster.

3. The laser beam machine according to claim 2, further comprising:
a fourth adjuster configured to change a distance from the image forming position to a surface of the workpiece, wherein
the controller is configured to adjust a distance from the image forming position to a surface of the workpiece independently for each of adjustment of the beam diameter and adjustment of the emission numerical aperture, by controlling the fourth adjuster.

4. The laser beam machine according to claim 3, further comprising:
a nozzle configured to emit the laser light toward the workpiece and send out machining gas; and
a fifth adjuster configured to change a distance from the nozzle to a surface of the workpiece, wherein
the controller is configured to adjust a distance from the nozzle to a surface of the workpiece independently for each of adjustment of the beam diameter and adjustment of the emission numerical aperture, by controlling the fifth adjuster.

5. The laser beam machine according to claim 2, further comprising:
a nozzle configured to emit the laser light toward the workpiece and send out machining gas; and
a fifth adjuster configured to change a distance from the nozzle to a surface of the workpiece, wherein
the controller is configured to adjust a distance from the nozzle to a surface of the workpiece independently for each of adjustment of the beam diameter and adjustment of the emission numerical aperture, by controlling the fifth adjuster.

6. The laser beam machine according to claim 1, further comprising:
a fourth adjuster configured to change a distance from the image forming position to a surface of the workpiece, wherein
the controller is configured to adjust a distance from the image forming position to a surface of the workpiece independently for each of adjustment of the beam diameter and adjustment of the emission numerical aperture, by controlling the fourth adjuster.

7. The laser beam machine according to claim 6, further comprising:

a nozzle configured to emit the laser light toward the workpiece and send out machining gas; and
a fifth adjuster configured to change a distance from the nozzle to a surface of the workpiece, wherein
the controller is configured to adjust a distance from the nozzle to a surface of the workpiece independently for each of adjustment of the beam diameter and adjustment of the emission numerical aperture, by controlling the fifth adjuster.

8. The laser beam machine according to claim 1, further comprising:
a nozzle configured to emit the laser light toward the workpiece and send out machining gas; and
a fifth adjuster configured to change a distance from the nozzle to a surface of the workpiece, wherein
the controller is configured to adjust a distance from the nozzle to a surface of the workpiece independently for each of adjustment of the beam diameter and adjustment of the emission numerical aperture, by controlling the fifth adjuster.

9. The laser beam machine according to claim 1, wherein each of the plurality of lenses of the first adjuster has a different focal length.

10. The laser beam machine according to claim 9, wherein the option deviated from the optical axis allows the optical axis to pass through a portion of a corresponding lens when the corresponding lens is in the position deviated from the optical axis.

11. The laser beam machine according to claim 10, wherein the first adjuster is configured to move each of the plurality of lenses between the position on an optical axis and the position deviated from the optical axis.

12. The laser beam machine according to claim 11, wherein the first adjuster is further configured to move each of the plurality of lenses along the optical axis.

13. The laser beam machine according to claim 1, wherein the second adjuster includes a plurality of lenses that are movable along the optical axis.

14. The laser beam machine according to claim 1, wherein the first adjuster and the second adjuster are independently controllable by the controller.

15. The laser beam machine according to claim 1, wherein the first adjuster is further configured to switch the plurality of lenses through which the laser light passes by inserting each lens into the optical axis and extracting each lens from the optical axis.

16. The laser beam machine according to claim 1, wherein the first adjuster is further configured to change a divergence angle by switching a lens through which the laser light passes.

17. A method for controlling a laser beam machine comprising:
a laser oscillator configured to output laser light;
a transmission fiber through which the laser light output from the laser oscillator propagates;
a first adjuster configured to change an incidence numerical aperture of the laser light incident to an incidence end of the transmission fiber, the first adjuster being disposed between the laser oscillator and the incidence end of the transmission fiber, the first adjuster including a plurality of lenses that are each movable into a position on an optical axis and into a position deviated from the optical axis; and
a second adjuster configured to converge the laser light and change a zoom magnification of the laser light between an emission end of the transmission fiber and a workpiece, the method comprising:
- adjusting a beam diameter of the laser light at an image forming position of the laser light by changing the zoom magnification by controlling the second adjuster; and
- adjusting an emission numerical aperture of the laser light emitted from the emission end of the transmission fiber, by changing the incidence numerical aperture by controlling the first adjuster, wherein a beam diameter change amount that is a change amount of the beam diameter with respect to a distance from the image forming position is adjusted independently of adjustment of the beam diameter by controlling the second adjuster, by adjusting the emission numerical aperture by controlling the first adjuster.

* * * * *